Figure 11:
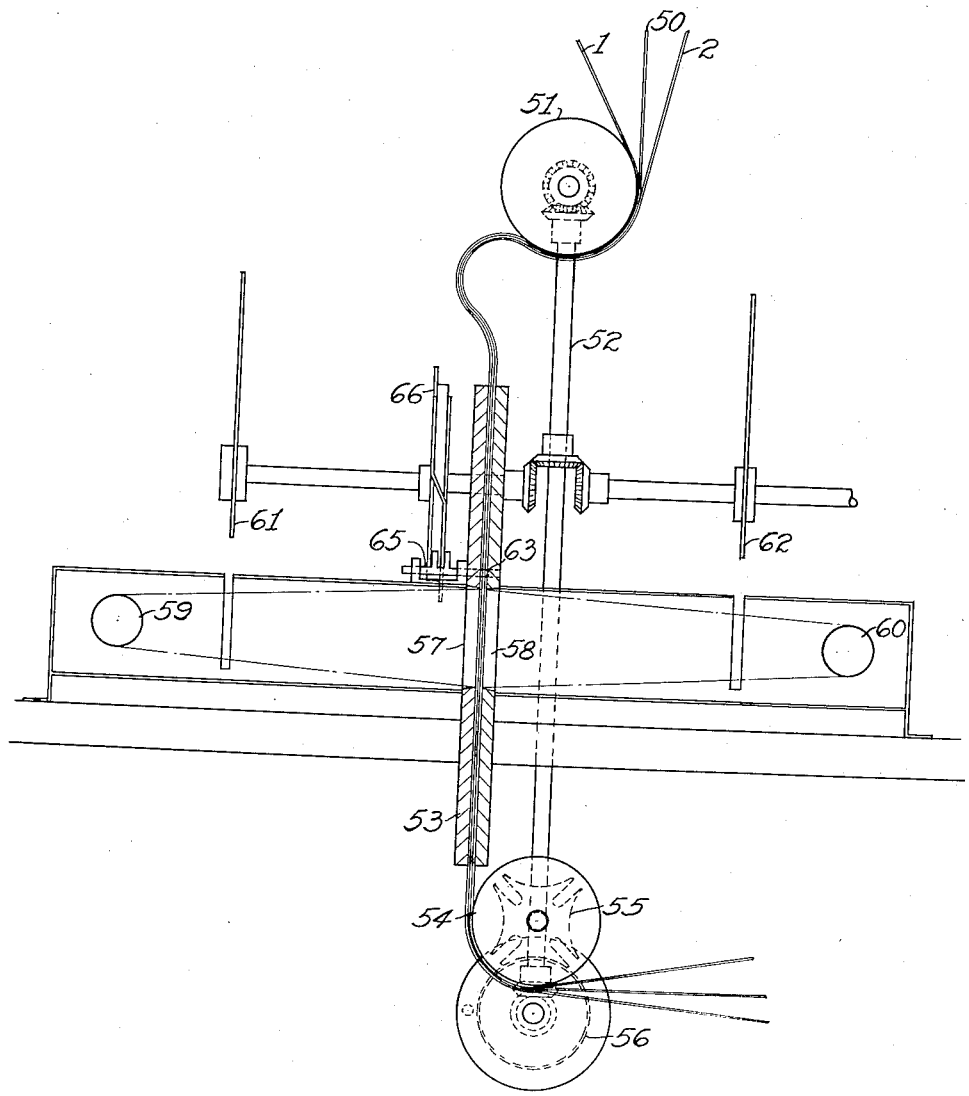

April 13, 1926.
P. D. BREWSTER
1,580,114
COLOR CINEMATOGRAPHY
Original Filed March 23, 1918    3 Sheets-Sheet 1
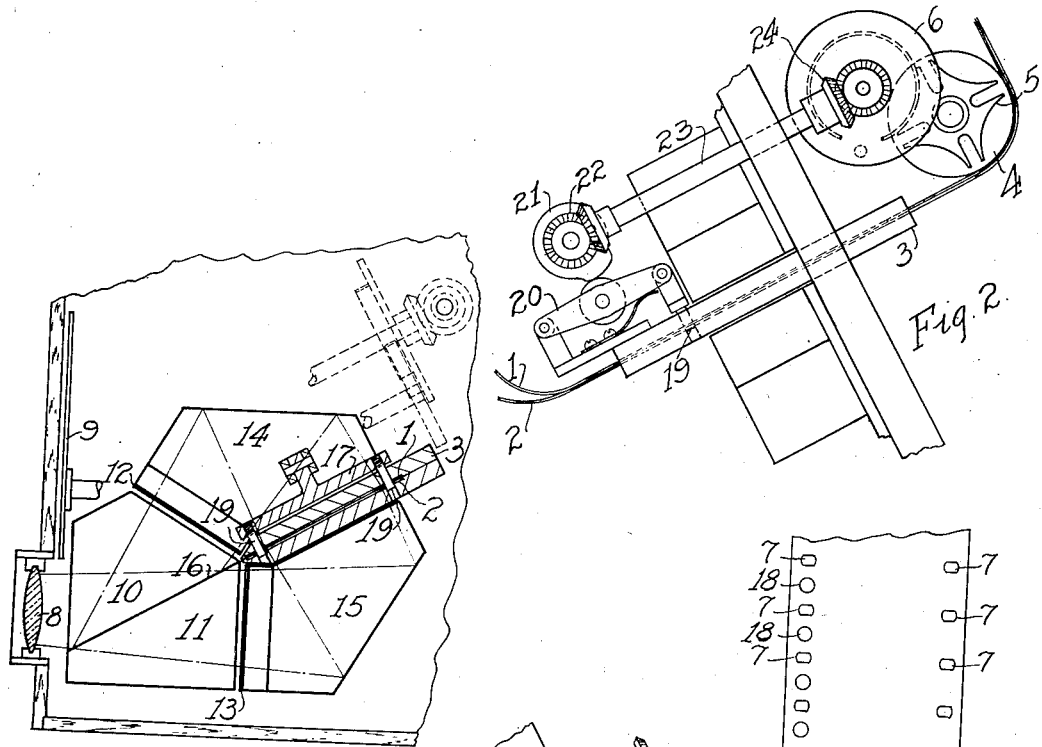
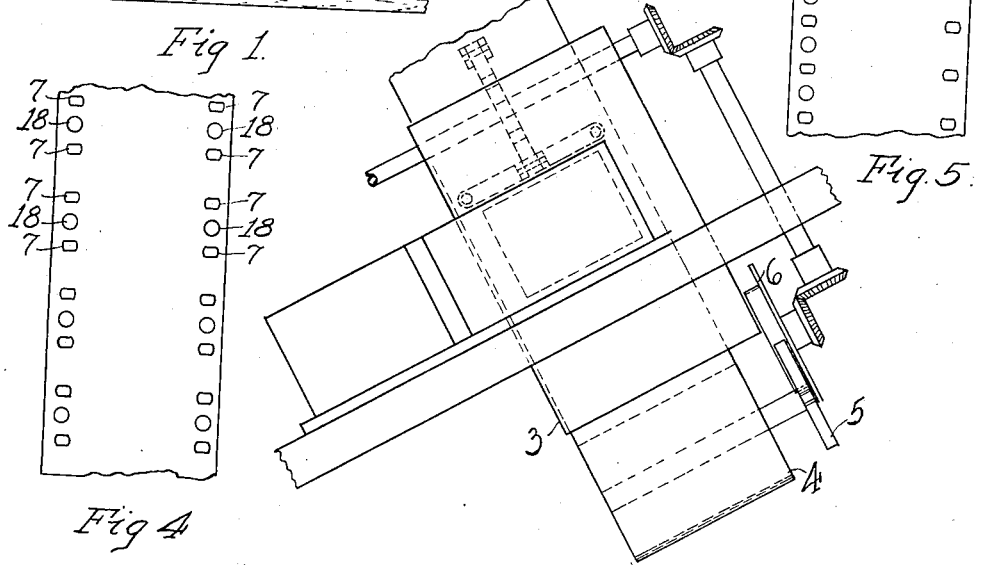
INVENTOR.

April 13, 1926.
P. D. BREWSTER
1,580,114
COLOR CINEMATOGRAPHY
Original Filed March 23, 1918    3 Sheets-Sheet 2
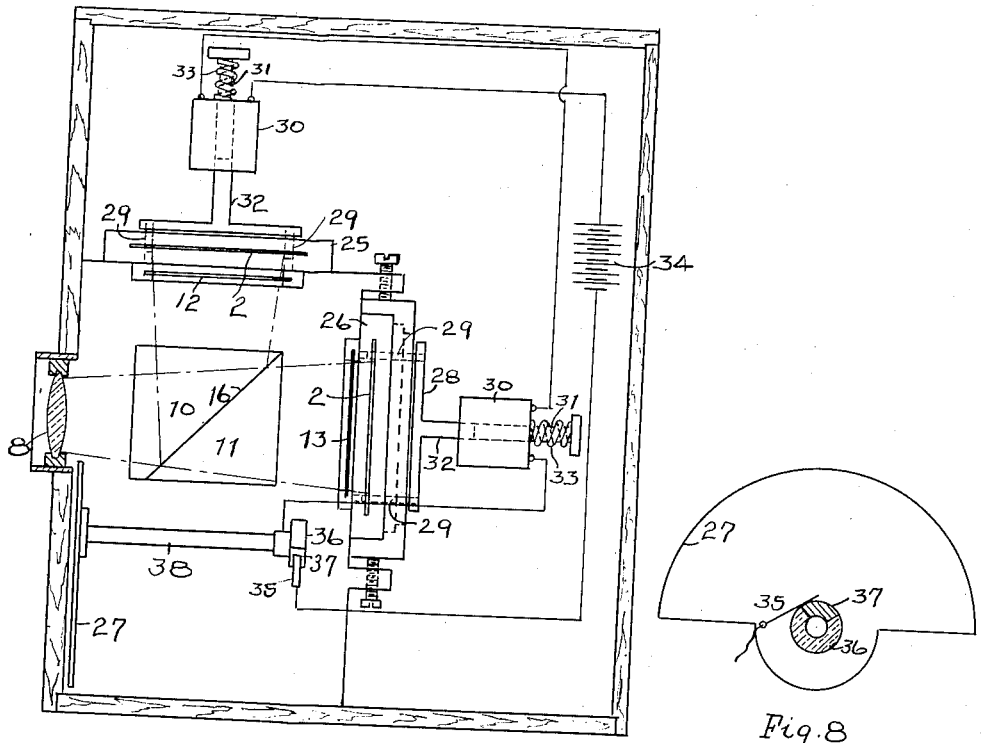
Fig. 6
Fig. 8
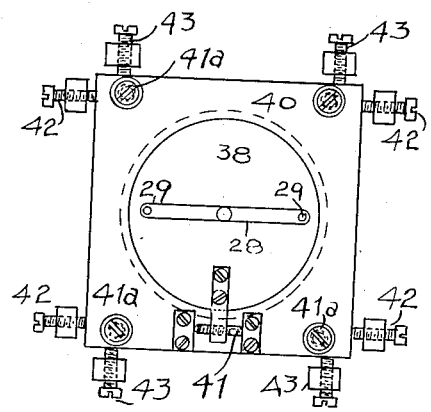
Fig. 7
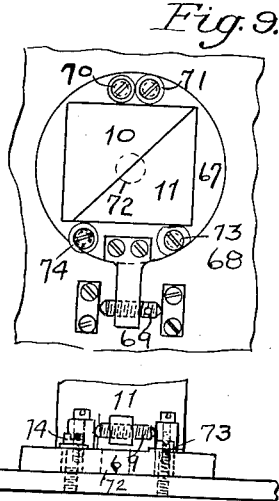
Fig. 9
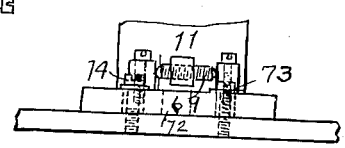
Fig. 10
INVENTOR
Percy D. Brewster April 13, 1926.

P. D. BREWSTER 1,580,114

COLOR CINEMATOGRAPHY

Original Filed March 23, 1918    3 Sheets-Sheet 3

INVENTOR.

Patented Apr. 13, 1926.

1,580,114

UNITED STATES PATENT OFFICE.

PERCY D. BREWSTER, OF EAST ORANGE, NEW JERSEY.

COLOR CINEMATOGRAPHY.

Application filed March 23, 1918, Serial No. 224,110. Renewed July 16, 1925.

*To all whom it may concern:*

Be it known that I, PERCY D. BREWSTER, a citizen of the United States, residing at East Orange, Essex County, New Jersey, have invented new and useful Improvements in Color Cinematography, of which the following is a specification.

My present invention relates to a camera and printer mechanism for two color cinematography using two separate negative films and comprises special means for securing exact registry between the images on the negative films.

The invention consists broadly in perforating the two negative films while they are at rest in the film gate or gates for making the exposure, the perforations being as near as possible to the position of the image photographed on the film and registering the two negative films, in relation to each other when printing the positive by means of these perforations.

I am aware that cameras for black and white have been made in which the film was perforated in the film gate and registry with the positive when printing was secured by these perforations and also that it has been suggested to expose two separate films in two film gates and to print by contact on the two sides of a double coated positive film from the two negative films obtained, but this process has been a failure to date due to insuperable difficulties in registration and the object of this invention is to provide means for securing the necessary degree of registry.

My invention is illustrated in the accompanying drawing of which Fig. 1 is a plan view of the camera partly in section; Figs. 2 and 3 are diagrammatical side elevations at right angles and parallel to the films respectively; Figs. 4 and 5 illustrate different perforating systems; Fig. 6 is a section through a modified camera using separate film gates; Fig. 7 illustrates the adjusting means used to center the aperture plate; Fig. 8 is a detail of the shutter and commutator mechanism; Figs. 9 and 10 are plan view and side elevation of a means of adjusting the splitting prism; Fig. 11 is a diagrammatical section through one type of printer.

The films, 1 and 2, with the sensitized emulsion on the inside in contact or on the outside, are fed intermittently through the film gate 3 by any well known means, such as the Geneva or Lumière movements. The Geneva movement illustrated comprises the film sprocket 4 attached to the star wheel 5, driven intermittently by the pin wheel 6 in connection with the camera driving mechanism. The films before being placed in the camera may be perforated in the standard manner, that is with four perforations per picture, or preferably perforated with half the standard number of perforations 7, 7, as shown in Fig. 4. Unperforated film may be used and can be fed into and from the film gate by suitable well known friction means. Preferably the film is passed through the film gate by upper and lower feed sprockets having half the usual number of teeth removed.

Separate photographic images are projected from the lens 8 onto the emulsions on negative films 1 and 2 through different color filters so that simultaneously pictures from the same view point in two colors are made, that is, a series of negative images of one color-value on one negative film and another series of negative images of the same object on the other film but of another color-value. The shutter 9 is adapted to prevent light from reaching the films while they are moving. The light rays projected by the lens 8 onto splitting prism 10 are divided by the silver strips on the surface 16 into two groups one of which is reflected and the other transmitted. The transmitted light passes through the red filter 13 and is reflected by the prism or mirror 15 onto the film 2, while the reflected light rays pass through the blue-green filter 12 and are reflected by the prism or mirror 12 onto film 1. Adjusting means on the prism are provided to secure exact registry of the two pictures on the film.

While the two films are stationary in the film gate before, during or after the exposure is made, two holes 18, 18 are punched through both films exactly superposed, preferably by the same pair of punches, and located as near the picture on the film as possible. The perforations may be located one on either side of the film in the margin as in Fig. 4 or both perforations may be in one margin as in Fig. 5, or located as desired.

The punching mechanism illustrated in Fig. 1 comprises the yoke 17, carrying the two cutting dies 19, 19 which are guided by holes in the film gate 3, the punch being operated from the rocker arm 20, which, in turn, is controlled by the cam 21, driven from the Geneva movement by the gears 22 and 24 and shaft 23.

The general effect is to perforate a pair of registry or master perforations or holes in the film preferably for each picture taken that are in identically the same location from the image photographed on the two films, the images on the two films being exactly registered in the film gate, so that when the two holes in the two films are superposed later in printing on both sides of the positive film, the images will exactly register. More than two holes may be perforated if desired or a single hole may be perforated and the two films guided on one side, however I prefer to punch two holes.

The same objects are attained in the camera illustrated in Fig. 6 in which the negative films 1 and 2 are fed intermittently through the separate film gates 25 and 26 respectively. Light rays from the lens 8, controlled by shutter 27, are divided in a similar manner by the splitting prism 10—11, the transmitted light being projected through the red filter 13 onto the film 2, while the reflected light is projected through the filter 12 onto the film 1.

Film gates 25 and 26 are provided with yokes 28, 28 carrying the cuttting dies 29, 29 guided in the film gate. An electrical method using solenoids is shown for operating the punches, comprising the solenoids 30, 30 having cores made in two parts, non-magnetic part 32 being attached to the yokes, while the magnetic portion 31 is mounted so as to be drawn into the coil when it is magnetized. Springs 33, 33 are adapted to withdraw the dies. Current for the solenoids is supplied by battery or generator 34 and their actions are controlled by the insulated commutator 36, operating for convenience on shutter shaft 38, carrying the metal segment 37 "grounded" on the shaft so that when this segment comes in contact with the brush 35, the circuit is closed and the punches operate.

Any type of mechanism, electrical or mechanical, for operating the punches may be used.

In this type of camera either one of two general adjusting means are necessary for the two pictures are originally not in registry nor are the perforating dies necessarily in perfect alignment with each other, so that provision must be made for adjusting one set of dies in relation to the other or by adjusting the images so that they will have exactly the same relation to the punches, which are fixed in place. In Fig. 7 the punch block 38, carrying the yoke 28 and dies 29, 29 as well as the film aperture is mounted to turn in the block 40, controlled by capstan screw 41, the block may be adjusted vertically by means of stops and adjusting screws 43, 43 and horizontally by means of screws 42, 42. The block is drilled with ample clearance holes for screws 41$^a$, 41$^a$ and held in place by washers on said screws.

To test for registry a pair of pictures, preferably made simultaneously, are superposed with a pair of pins of proper size in the perforations and the registry of the images examined preferably with a low power microscope and any error in registry measured and compensated for with the adjustments provided.

If registry is to be made by optical means, the pair of perforating dies are set as nearly true as possible and fixed permanently in place and provision is made for shifting the image. Referring to Figs. 9 and 10 the splitting prism 10—11 is mounted on the disk 67 adapted to turn on pin 72 in the camera base plate 68 on the point of intersection of the axial ray from the lens and the splitting surface of the mirror horizontal, its movement being controlled by the capstan screw 69 and its vertical movement by the "jam" screws 70 and 73 tapped into disk 67 and bearing against base 68, the disk being held in place by screws and washers 71 and 74. Clearance holes in disk 67 for screws 71 and 74 are ample to permit the very slight movement required for horizontal adjustment. With these means any error in registry of the images can be corrected and a series of pairs of images secured that exactly register when pins are in their relative perforations.

Positive prints of several different types may be made from these negatives, for example a single coated positive film may be perforated to conform to the negative film perforations, and printed in contact with one negative, the images developed and properly colored and waterproofed and another emulsion coated on top or on the other side and the positive film again printed from properly corresponding pictures on the other negative, the images, developed and colored to form the finished print. A second method is to use film coated on both sides with light-sensitive positive emulsions perforated to correspond with the master perforations on the negative films, print on one side from one negative in contact, registering by means of the perforations, and then from the other negative film on the other side again registering by the perforations, develop the images and color them on the two sides in the proper colors.

However, I prefer to print simultaneously on the two sides of a double coated positive film from the two negative films. This positive film may be perforated to correspond with the master perforations on the negative films and registry secured by passing a pin through the three films or the positive film may use the standard perforations and allow the registering pins for the two negative films to pass through the perforations.

The printer illustrated in Fig. 11 shows the two negative films 1 and 2 and double coated positive film 50, drawn from their containers and "looped" by sprocket or friction feed 51, driven from operating shaft 52, the films being fed intermittently through the film gate 53 by means of the Lumière or Geneva movement, illustrated by sprocket 54 connected to star wheel 55 and driven by the pin wheel 56 from shaft 52. Double apertures 57 and 58 are cut in the film gate to expose the two films to the action of lights 59 and 60 respectively, the action of the light being controlled by the shutters 61 and 62 adapted to protect the films when they are moving. Before the film is exposed but after coming to rest, the pins 63 in yoke 65, driven by the drunken screw 66, are forced into the master perforations in the two negative films at least or all three films and the negative images superposed, it being understood that the positive film has perforations into which the pins fit. The pins are withdrawn before the films start to move after the exposure. If desired the film gate may be constructed to separate slightly when the films are moving and to press together before the exposure is made. I then develop the images on the two sides of the film in the ordinary way and convert the silver images to dye images by any well known means.

I claim,—

1. In the art of two-color cinematography, the improvement comprising projecting in a suitable camera images of the object upon two separate negative films in light of different colors for the production of a series of negative images of one color-value on one film and a series of negative images of the other color-value on the other film, perforating the two negative films at definitely located points with respect to the images while the films are at rest in the camera to produce registry perforations, printing one series of images on one side of a positive film sensitized on both sides and printing the other series of images on the other side of the positive film, and registering the images on one side with the respective images on the other side by registry pins passing through perforations in the positive film and through the aforesaid registry perforations in the negative film from which the printing is being effected.

2. In the art of two-color cinematography, the improvement comprising projecting images of the object in light of different colors upon two separate films, and perforating the two films at points definitely and similarly located relatively to the respective images while the films are at rest.

3. In the art of two-color cinematography, the improvement comprising projecting simultaneously and from the same viewpoint two images of the object upon two separate films, and cutting a plurality of perforations in both films at points having exactly the same location relative to the respective images.

4. In the art of two-color cinematography, the improvement comprising projecting two separate images of the object upon two separate films, and perforating the two films on each side of the image and at exactly corresponding points on the two films while the same are at rest.

5. In the art of two-color cinematography, the improvement comprising dividing the light from the object into two groups, projecting the two groups through appropriate color-filters upon two separate negative films in a suitable camera for the production of separate color-value negative images, perforating the two negative films at definitely located points relative to the respective images while the films are at rest in the camera to produce registry perforations, and in printing from such negatives utilizing the said master perforations to receive registry pins to register the respective images on opposite sides of a positive film.

In testimony whereof, I have signed my name to this specification this 22nd day of March, 1918.

PERCY D. BREWSTER.